United States Patent
Niebling et al.

(12)

(10) Patent No.: US 6,230,848 B1
(45) Date of Patent: May 15, 2001

(54) WHEEL BEARING WITH BRAKING CONNECTION TO A BRAKE ELEMENT

(75) Inventors: Peter Niebling, Bad Kissingen; Harald Merklein, Schweinfurt; Reinhold Mahr, Friesenhausen; Roland Langer, Schwanfeld; Rainer Breitenbach, Gochsheim; Heinrich Hofmann, Schweinfurt, all of (DE)

(73) Assignee: FAG Automobiltechnik AG (DE)

( * ) Notice: Subject to any disclaimer, the term of this patent is extended or adjusted under 35 U.S.C. 154(b) by 0 days.

(21) Appl. No.: 09/092,472

(22) Filed: Jun. 5, 1998

(30) Foreign Application Priority Data

Jun. 5, 1997 (DE) .................................. 197 23 578

(51) Int. Cl.[7] ..................................................... B60T 1/06
(52) U.S. Cl. .................................. 188/18 A; 188/218 R; 301/105.1
(58) Field of Search .................... 188/73.31, 218 XL, 188/218 R, 18 A; 301/6.1, 105.1

(56) References Cited

U.S. PATENT DOCUMENTS

| 2,097,125 | * | 10/1937 | Le Jeune | 188/218 R |
| 2,274,503 | * | 2/1942 | Reid | 188/218 R |
| 3,758,129 | * | 9/1973 | Ishikawa et al. | 188/18 A |
| 4,082,363 | * | 4/1978 | Goodbary | 188/18 A |
| 4,690,462 | * | 9/1987 | Bantle et al. | 301/105.1 |
| 5,988,324 | * | 11/1999 | Bertetti et al. | 188/18 A |

FOREIGN PATENT DOCUMENTS 3012420   10/1981 (DE) .

OTHER PUBLICATIONS

H. Hofmann, et al., "Motor Vehicle Wheel Bearing Mountings: Trend Towards Bearing Units Also for Nonpowered Wheels", Motor Vehicle Wheel Bearing Mountings, Publication No. 05119 EA, Sep. 1985, FAG Kugelfischer Georg Schäfer KGaA, pp. 10–16.

* cited by examiner

*Primary Examiner*—Chris Schwartz
*Assistant Examiner*—Mariano Sy
(74) *Attorney, Agent, or Firm*—Ostrolenk, Faber, Gerb & Soffen, LLP

(57) ABSTRACT

A wheel bearing includes a roller bearing and a wheel flange is disposed around the bearing. The periphery of the wheel flange is profiled over approximately half its axial width with a peripheral locking receptacle in the form of a polygon or polyhedron shape for receiving a brake disk or brake drum thereon and for transmitting the torque between the brake disk or drum and the wheel flange. In addition, fastening bolts between the brake disk or drum and the wheel flange are received in holes in the wheel flange for holding the brake disk or drum to the wheel flange. But, the torque is transmitted due to the peripheral locking receptacle formed on the wheel flange.

8 Claims, 2 Drawing Sheets

WHEEL BEARING WITH BRAKING CONNECTION TO A BRAKE ELEMENT

SUMMARY OF THE INVENTION

The object of the invention is to develop a wheel bearing of the above type in such a way that there is a relatively simple connection and transmission of torque between the brake disk or drum and the wheel bearing, and wherein little weight is required in the elements to effect that connection.

The invention concerns a wheel bearing in particular for a motor vehicle wherein the wheel bearing has a central hub, a wheel flange around the hub, and at least one roller bearing between them. The roller bearing may be connected with or integrated with the wheel flange. A brake drum or brake disk may be detachably fastened to the wheel flange.

The wheel flange around the outer raceway has a periphery with a positive locking receptacle for receiving a brake drum or brake disk thereat, and the brake disk or brake drum has a shape for cooperating with the positive locking receptacle on the wheel flange, such that torque is transmitted between the brake disk or drum and the wheel flange at the positive locking receptacle.

The wheel flange has a positive locking connection formed thereon, for example the flange may have a polygon or polyhedron shaped periphery, e.g. an octagon shape. The brake drum or brake disk has an opening therein to cooperate with the shape of the exterior of the wheel flange for transmitting torque from the brake disk or drum to the flange. There are appropriate fastening means for the brake disk or the brake drum on the wheel flange. Those fastening means may comprise bolts that pass through appropriate threaded holes.

Other features and advantages of the present invention will become apparent from the following description of an exemplary embodiment of the invention which refers to the accompanying drawings.

DETAILED DESCRIPTION OF A PREFERRED EMBODIMENT

Figure 1:
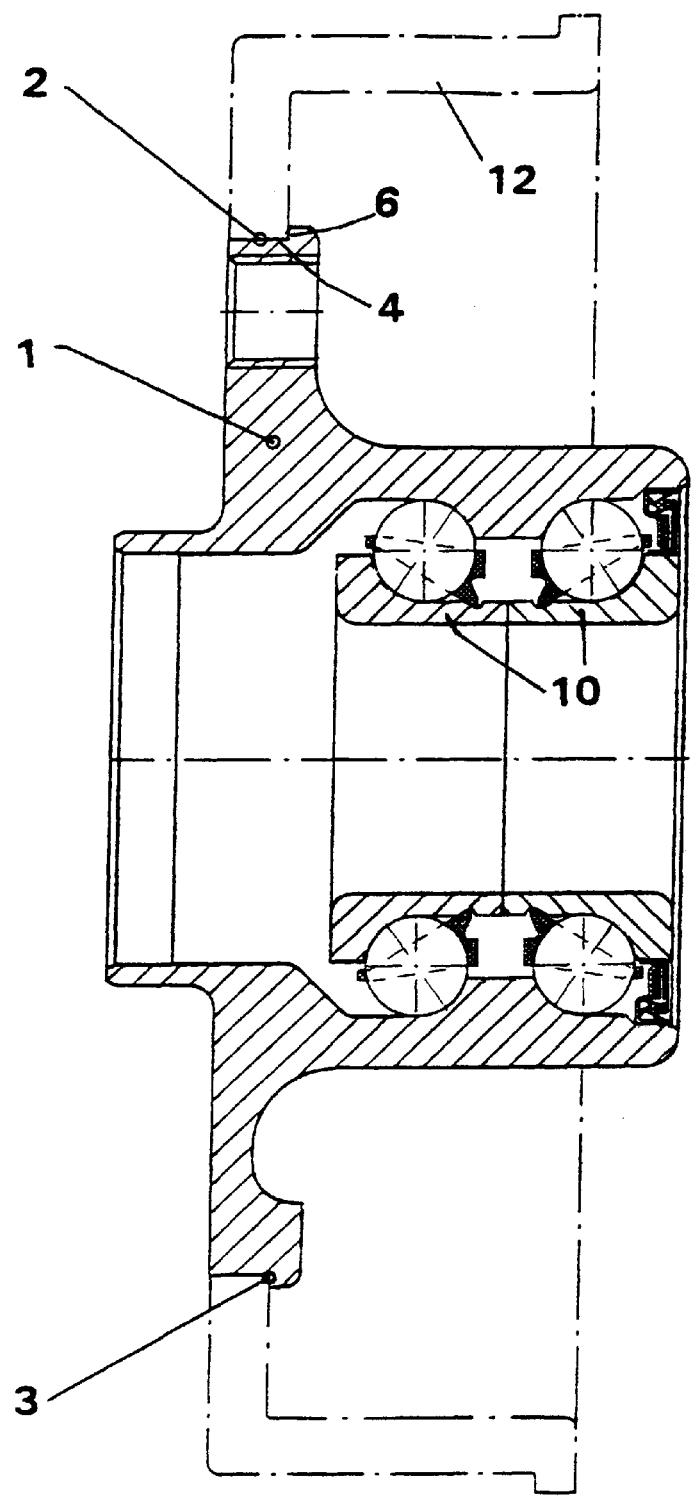
FIG. 1 shows a transverse cross-section through a wheel bearing according to the invention.
Figure 2:
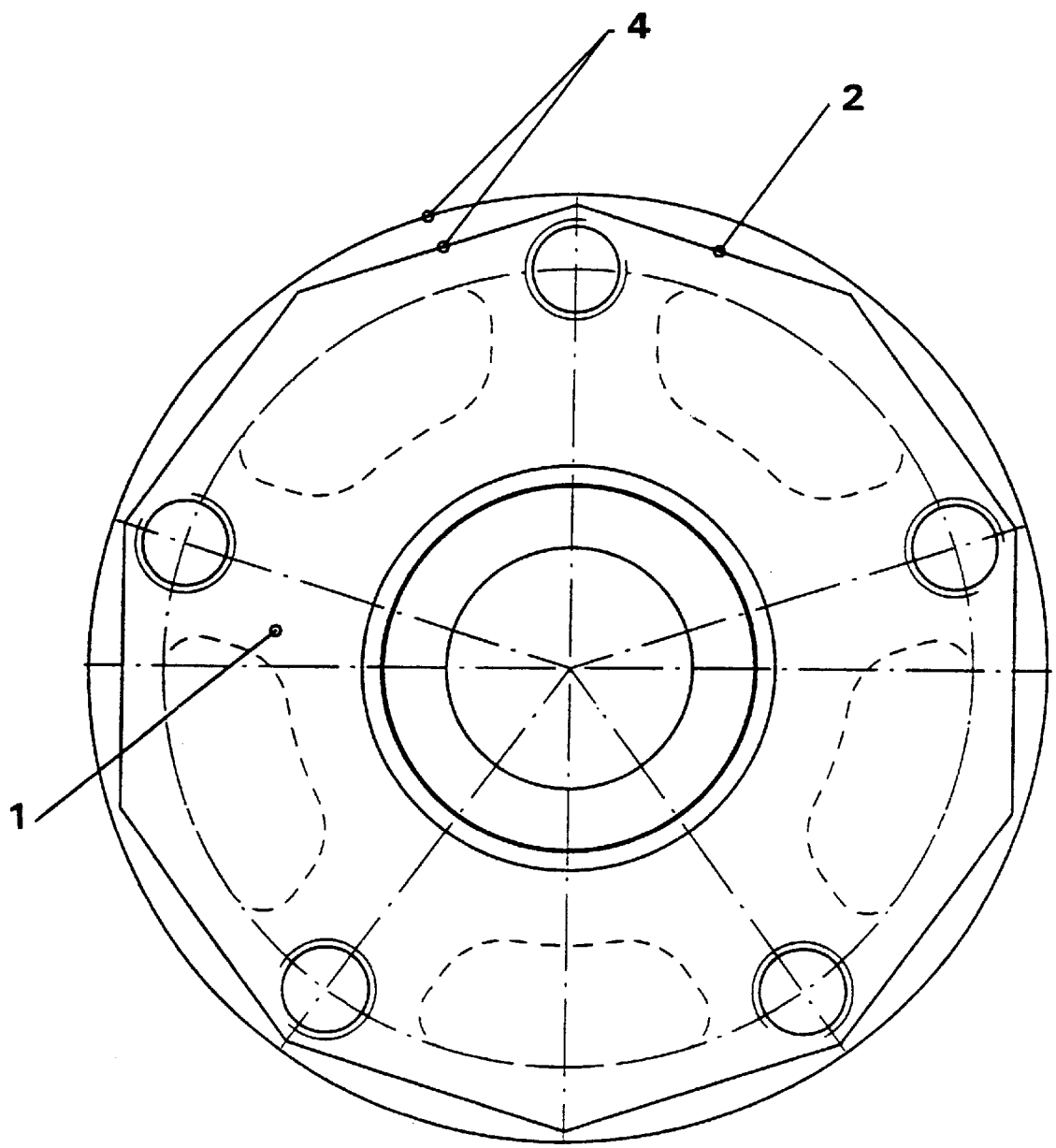
FIG. 2 is a front view showing an inventive means of fastening a brake disk or brake drum to the wheel flange by means of a polyhedron with axial securing means.

FIGS. 1 and 2 show a bearing of the type described above which is well known and need not be described here. It is sufficient to note that the wheel bearing which includes a pair of roller bearings between the pair of inner rings 10 which each define a raceway for a respective row of bearing balls, and a wheel flange 1 which has a raceway for both rows of balls. The outer ring is defined radially inside the wheel flange 1. The present invention concerns the manner of attaching a brake drum or brake disk 12, illustrated with broken lines in FIG. 1 to the periphery of the wheel flange 1.

The wheel flange has a positive locking receptacle for a brake disk or drum. As shown in FIG. 2, the receptacle comprises a regular polygonal or polyhedronal surface at 4 which defines a form lock for the brake disk or drum that is installed over the surface 4. That polygonal shape form does not extend over the full axial direction width of the wheel flange, as can be seen in FIG. 1, but rather extends over approximately half its width. The remainder of the width of the wheel flange is circular as illustrated. The interface between the sections of the wheel flange defines a pocket at 4, 6 for the interior of the radial brake disk or brake drum. As shown in FIG. 1, the dividing wall 3 between the polyhedronal or polygonal section of the wheel flange and the other half thereof defines an axial stop for the brake disk so that the brake disk can be installed on the polygonal portion of the flange. There is a radial centering of the brake disk or brake drum at the axial point of contact and caused thereby.

The regular polygonal or polyhedronal shape for the periphery of the wheel flange is a matter of choice and another polygonal shape may be selected, e.g. hexagon or only partially polygonal or other form locking shape may be selected. It is preferably symmetrical around the flange.

The radial interior of the brake disk or drum has an opening with a bore that is shaped so as to cooperate with the shape of the periphery of the wheel flange providing form locked connection therebetween.

There are fastening means at 2 for fastening the brake disk or brake drum to the wheel flange. The fastening means may comprise drilled holes in the wheel flange and threaded bolts passing through the brake disk into the holes in the wheel flange and being threaded thereat. Other fastening means are appropriate for holding the brake disk on the wheel flange. However, the fastening means is not the sole means that prevents the brake disk or drum from moving with reference to the wheel flange or that transmits the torque between them. Rather, it is the form locked connection between the brake disk or drum and the wheel flange that controls the extent of relative rotation between them and that absorbs the torque and need not be too strong.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel bearing having a locking arrangement for securing a brake disk or brake drum thereto, comprising:

a wheel flange formed around an outer raceway of the wheel bearing, the wheel flange having a periphery shaped as a regular polyhedron or polygon to form a positive locking receptacle for receiving a brake drum or a brake disk thereat, wherein the brake disk or brake drum has a shape for being received on and cooperating with the positive locking receptacle on the wheel flange, such that torque is transmitted between the brake disk or drum and the wheel flange at the positive locking receptacle, the wheel flange has an axial thickness and only a portion of the axial thickness has the locking receptacle defined thereon while a remaining portion of the thickness of the wheel flange does not;

fastening means for fastening the brake disk or drum to the wheel flange.

2. The wheel bearing of claim 1, wherein the wheel flange includes an axial stop thereon for the brake disk or drum installed thereon.

3. The wheel bearing of claim 2, wherein the axial stop is located along the thickness of the wheel flange between the positive locking receptacle and the remaining portion thereof.

4. The wheel bearing of claim 1, wherein the polygon or polyhedron is an octagon.

5. The wheel bearing of claim 1, wherein the fastening means comprises bolts extending between the brake disk or drum and the wheel flange.

6. The wheel bearing of claim 5, wherein the fastening means further comprises holes in the wheel flange for receiving the bolts therein.

7. The wheel bearing of claim 1, wherein the brake disk or drum is radially centered at an axial point of contact between the positive locking receptacle of the wheel flange and the remaining portion of the thickness of the wheel flange.

8. The wheel bearing of claim 1, wherein the locking receptacle has a shape that is symmetrical around the periphery of the wheel flange.

* * * * *